US011924467B2

(12) United States Patent
Li et al.

(10) Patent No.: US 11,924,467 B2
(45) Date of Patent: Mar. 5, 2024

(54) MAPPING-AWARE CODING TOOLS FOR 360 DEGREE VIDEOS

(71) Applicant: GOOGLE LLC, Mountain View, CA (US)

(72) Inventors: Bohan Li, Santa Barbara, CA (US); Ching-Han Chiang, San Jose, CA (US); Jingning Han, Santa Clara, CA (US); Yao Yao, Baltimore, MD (US)

(73) Assignee: GOOGLE LLC, Mountain View, CA (US)

(*) Notice: Subject to any disclaimer, the term of this patent is extended or adjusted under 35 U.S.C. 154(b) by 185 days.

(21) Appl. No.: 17/527,590

(22) Filed: Nov. 16, 2021

(65) Prior Publication Data

US 2023/0156221 A1    May 18, 2023

(51) Int. Cl.
*H04N 19/597* (2014.01)
*H04N 19/139* (2014.01)
*H04N 19/167* (2014.01)
*H04N 19/176* (2014.01)
*H04N 19/182* (2014.01)
(Continued)

(52) U.S. Cl.
CPC ......... *H04N 19/597* (2014.11); *H04N 19/139* (2014.11); *H04N 19/167* (2014.11); *H04N 19/176* (2014.11); *H04N 19/182* (2014.11); *H04N 19/52* (2014.11); *H04N 19/57* (2014.11); *H04N 19/583* (2014.11); *H04N 19/80* (2014.11)

(58) Field of Classification Search
CPC .... H04N 19/176; H04N 19/119; H04N 19/11; H04N 19/55; H04N 19/167; H04N 19/172; G06T 3/0062
See application file for complete search history.

(56) References Cited

U.S. PATENT DOCUMENTS

2018/0020238 A1* 1/2018 Liu .................. H04N 19/124
2018/0184121 A1* 6/2018 Kim .................. H04N 19/105
(Continued)

OTHER PUBLICATIONS

B. Vishwanath et al., "Rotational motion model for temporal prediction in 360 video coding," 2017 IEEE 19th International Workshop on Multimedia Signal Processing (MMSP), 2017, pp. 1-6.

*Primary Examiner* — Daniel Chang
(74) *Attorney, Agent, or Firm* — Young Basile Hanlon & MacFarlane, P.C.

(57) ABSTRACT

Mapping-aware coding tools for 360 degree videos adapt conventional video coding tools for 360 degree video data using parameters related to a spherical projection of the 360 degree video data. The mapping-aware coding tools perform motion vector mapping techniques, adaptive motion search pattern techniques, adaptive interpolation filter selection techniques, and adaptive block partitioning techniques. Motion vector mapping includes calculating a motion vector for a pixel of a current block by mapping the location of the pixel within a two-dimensional plane (e.g., video frame) onto a sphere and mapping a predicted location of the pixel on the sphere determined based on rotation parameters back onto the plane. Adaptive motion searching, adaptive interpolation filter selection, and adaptive block partitioning operate according to density distortion based on locations along the sphere. These mapping-aware coding tools contemplate changes to video information by the mapping of 360 degree video data into a conventional video format.

20 Claims, 10 Drawing Sheets

(51) Int. Cl.
   *H04N 19/52*      (2014.01)
   *H04N 19/57*      (2014.01)
   *H04N 19/583*     (2014.01)
   *H04N 19/80*      (2014.01)

(56) References Cited

U.S. PATENT DOCUMENTS

| | | | |
|---|---|---|---|
| 2019/0045212 A1* | 2/2019 | Rose | H04N 23/698 |
| 2019/0191177 A1* | 6/2019 | He | H04N 19/157 |
| 2020/0374552 A1* | 11/2020 | Skupin | H04N 19/132 |
| 2021/0227243 A1* | 7/2021 | Wu | H04N 19/176 |
| 2021/0289211 A1* | 9/2021 | Oh | H04N 19/186 |
| 2022/0130075 A1* | 4/2022 | Oh | G06T 17/00 |
| 2022/0224940 A1* | 7/2022 | Hur | H04N 19/132 |
| 2022/0256190 A1* | 8/2022 | Hur | G06T 9/40 |

* cited by examiner

MAPPING-AWARE CODING TOOLS FOR 360 DEGREE VIDEOS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

Disclosed herein are, inter alia, systems and techniques for mapping-aware coding for 360 degree videos.

A method according to an implementation of this disclosure comprises mapping a location of a pixel of a current block from a video frame to a sphere, determining a motion prediction of the pixel on the sphere from the location of the pixel to a predicted location of the pixel according to rotation parameters associated with the current block, mapping the predicted location of the pixel from the sphere to the video frame, determining a motion vector based on the location and the predicted location within the video frame, and encoding the current block based on the motion vector.

A method according to another implementation of this disclosure comprises determining a motion vector for predicting motion of a current block of a 360 degree video based on a location of a pixel of the current block within a video frame including the current block and based on a motion prediction of the pixel determined on a sphere representative of the 360 degree video from the location of the pixel to a predicted location of the pixel according to rotation parameters associated with the current block, and encoding the current block based on the motion vector.

A method according to yet another implementation of this disclosure comprises determining a location of a pixel of a current block within a video frame, determining a predicted location of the pixel within the video frame based on a motion vector for the current block, mapping the location of the pixel and the predicted location of the pixel from the video frame to locations on a sphere, determining rotation parameters associated with the current block based on the locations on the sphere, and decoding the current block for display in a 360 degree video using the rotation parameters.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
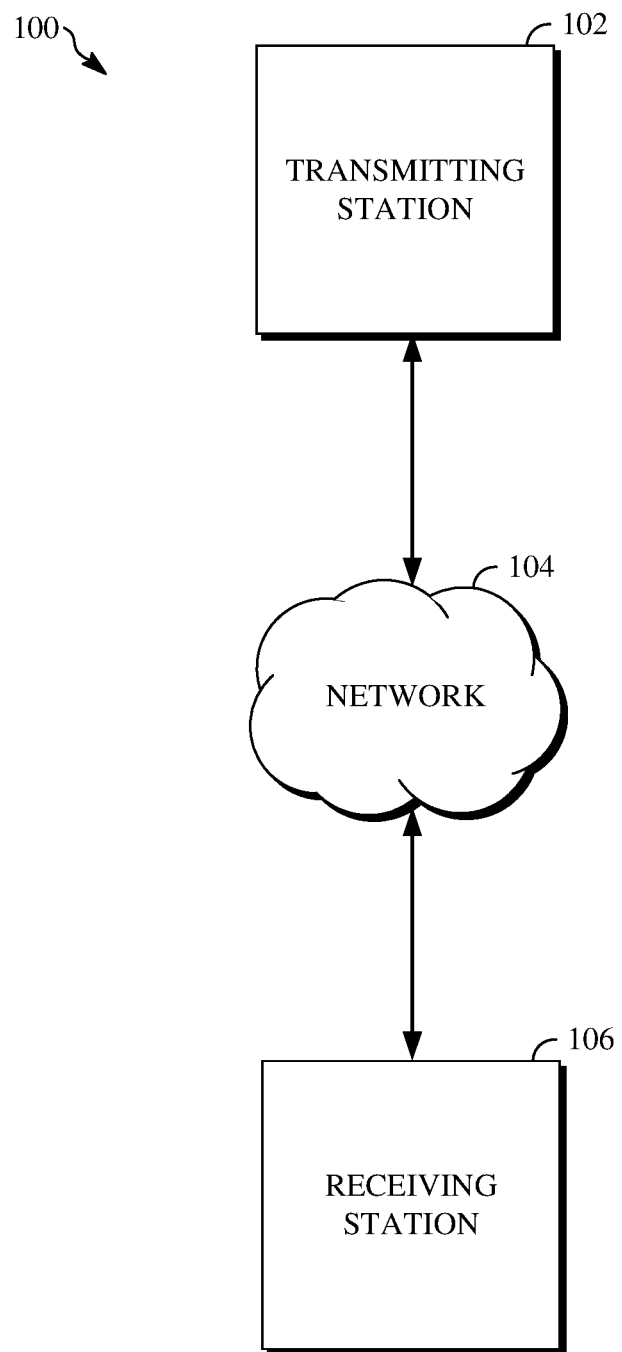
FIG. 1 is a schematic of an example of a video encoding and decoding system.

Video coding schemes may include breaking respective images, or frames, into smaller portions, such as blocks, and generating an encoded bitstream using techniques to limit the information included for respective blocks thereof. The encoded bitstream can be decoded to re-create the source images from the limited information. For example, an encoder can transform the prediction residual for a current video block into a number of transform coefficients, which are then quantized and entropy coded into an encoded bitstream. A decoder can process the encoded transform coefficients by inverse transformation to decode the encoded bitstream to prepare the video stream for viewing or further processing.

Conventional video coding schemes use tools for prediction, transformation, quantization, entropy coding, and filtering video information during encoding and decoding. These conventional video coding tools are specifically designed to process conventional video data, which generally is represented by rectangular video frames and rectangular video blocks partitioned within those rectangular video frames. However, those conventional video coding tools may not be adapted for other kinds of video, such as 360 degree video, which uses a spherical projection of video data rather than a rectangular structure.

A 360 degree video is a video in which views in every direction along a full sphere are concurrently captured and made available to a viewer. A 360 degree video may be captured using one or more cameras, such as a 360 degree camera. For example, a 360 degree camera may capture a sequence of two-dimensional video frames using image sensors arranged in opposing directions and then stitch the video frames together into the spherical shape. In some cases, the stitching may occur at a video hosting platform or site which receives the video frames from a 360 degree camera or other computing device. The 360 degree video is encoded by the mapping of the video data to a two-dimensional plane (e.g., a video frame) and transmitted to a 360 degree playback-enabled device (e.g., a virtual reality headset), which decodes the 360 degree video by mapping the video data thereof back into a spherical projection for display to the device user.

However, the mapping of video data to and from a spherical shape results in a disproportionate scaling of different parts of the video data based at least in part on how close those parts are to the middle of the sphere. For example, when a spherical image is mapped into an equirectangular format, there will necessarily be some disproportionate scaling of video data. This effect is commonly seen in Mercator projection maps of Earth's oceans and continents, such as by land masses near the top and bottom edges of the map appearing much larger than they actually are. Thus, because of this and the changing shapes and locations relative to one another of the various blocks in a 360 degree video, conventional video coding tools as designed are generally not usable to encode or decode 360 degree video data.

Implementations of this disclosure address problems such as these using mapping-aware coding tools for 360 degree videos, by which conventional video coding tools are adapted for use in encoding and decoding 360 degree video data using parameters related to the spherical projection of the 360 degree video data. The mapping-aware coding tools of the implementations of this disclosure include tools which perform motion vector mapping techniques, adaptive motion search pattern techniques, adaptive interpolation filter selection techniques, and adaptive block partitioning techniques. In one example, motion vector mapping according to the implementations of this disclosure includes calculating a motion vector for a pixel of a current block by mapping the location of the pixel within a two-dimensional plane (e.g., video frame) onto a sphere and later mapping a predicted location of the pixel on the sphere determined based on rotation parameters back onto the plane. In one example, adaptive motion searching according to the implementations of this disclosure includes adapting a size of a motion search window according to density distortion based on locations along the sphere. In one example, adaptive interpolation filter selection according to the implementations of this disclosure includes selecting a sub-pixel filter precision according to density distortion based on locations along the sphere. In one example, adaptive block partitioning according to the implementations of this disclosure includes partitioning blocks based on a scaling factor according to density distortion based on locations along the sphere. These mapping-aware coding tools contemplate the scaling of, warping of, and similar changes to video information by the mapping of 360 degree video data into a conventional video format.

Further details of techniques for mapping-aware coding for 360 degree videos are described herein with initial reference to a system in which such techniques can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
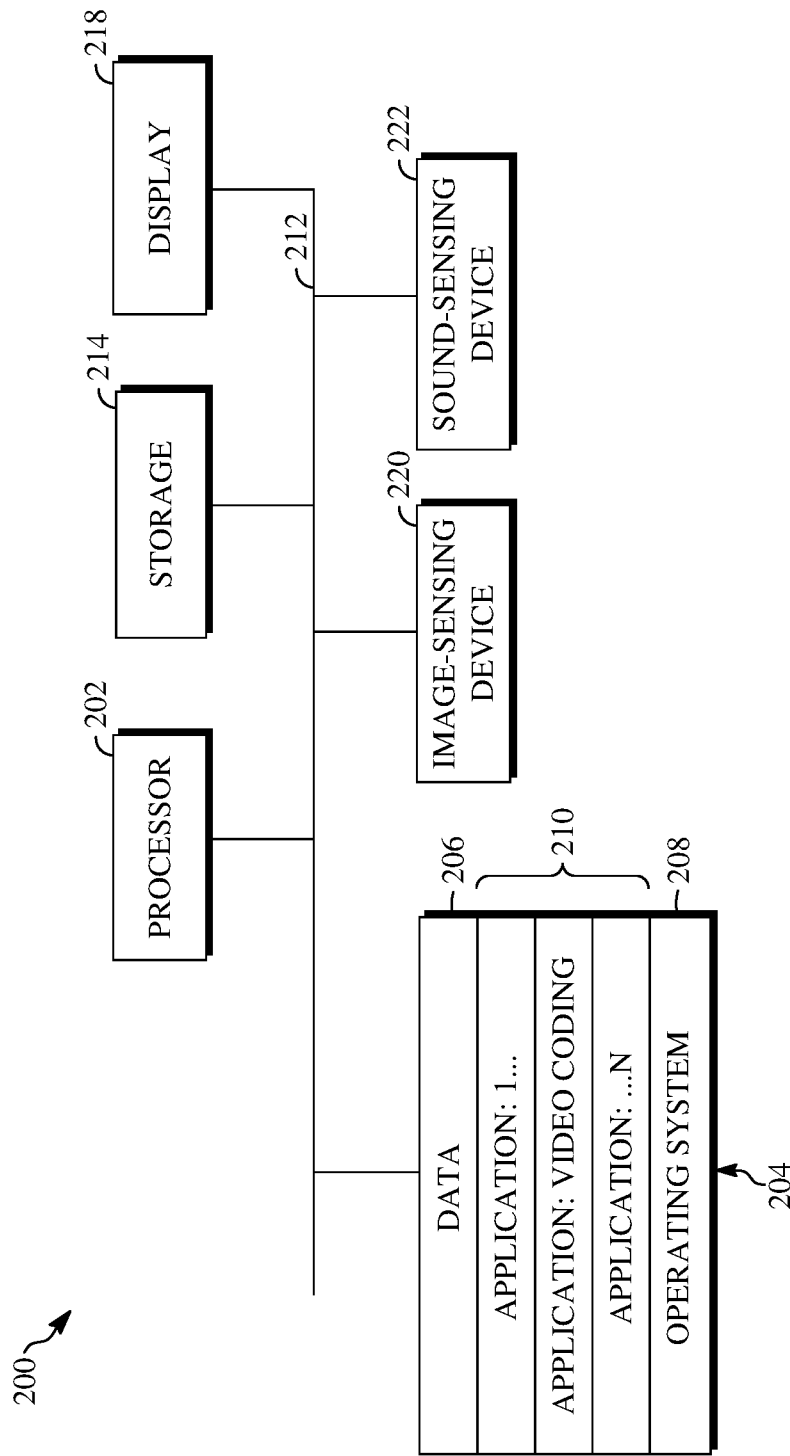
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
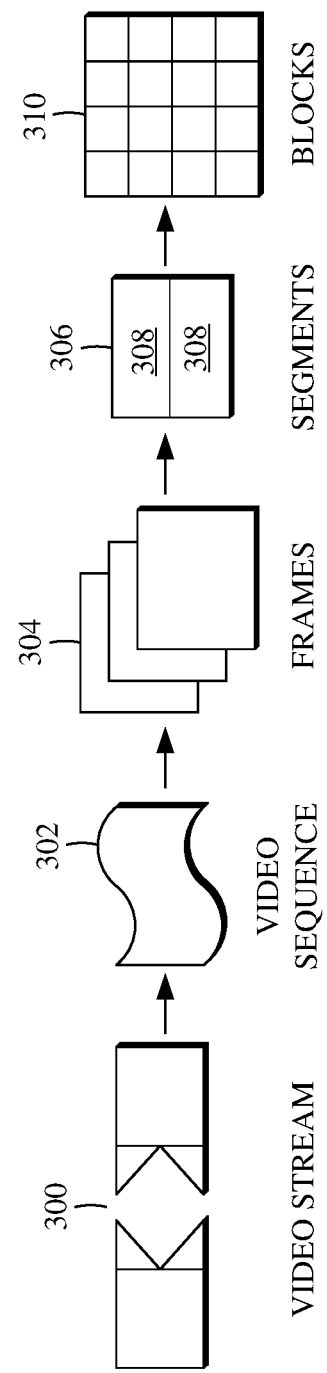
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
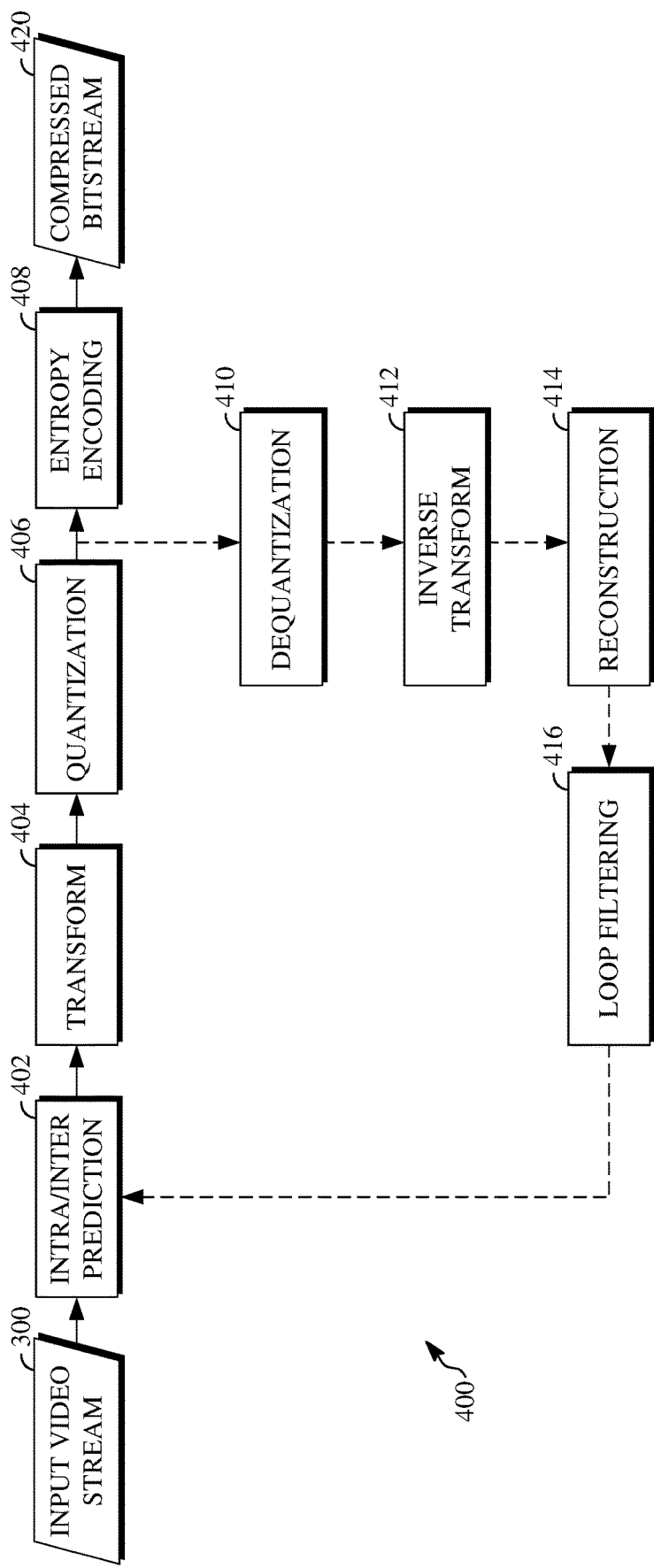
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In some implementations, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
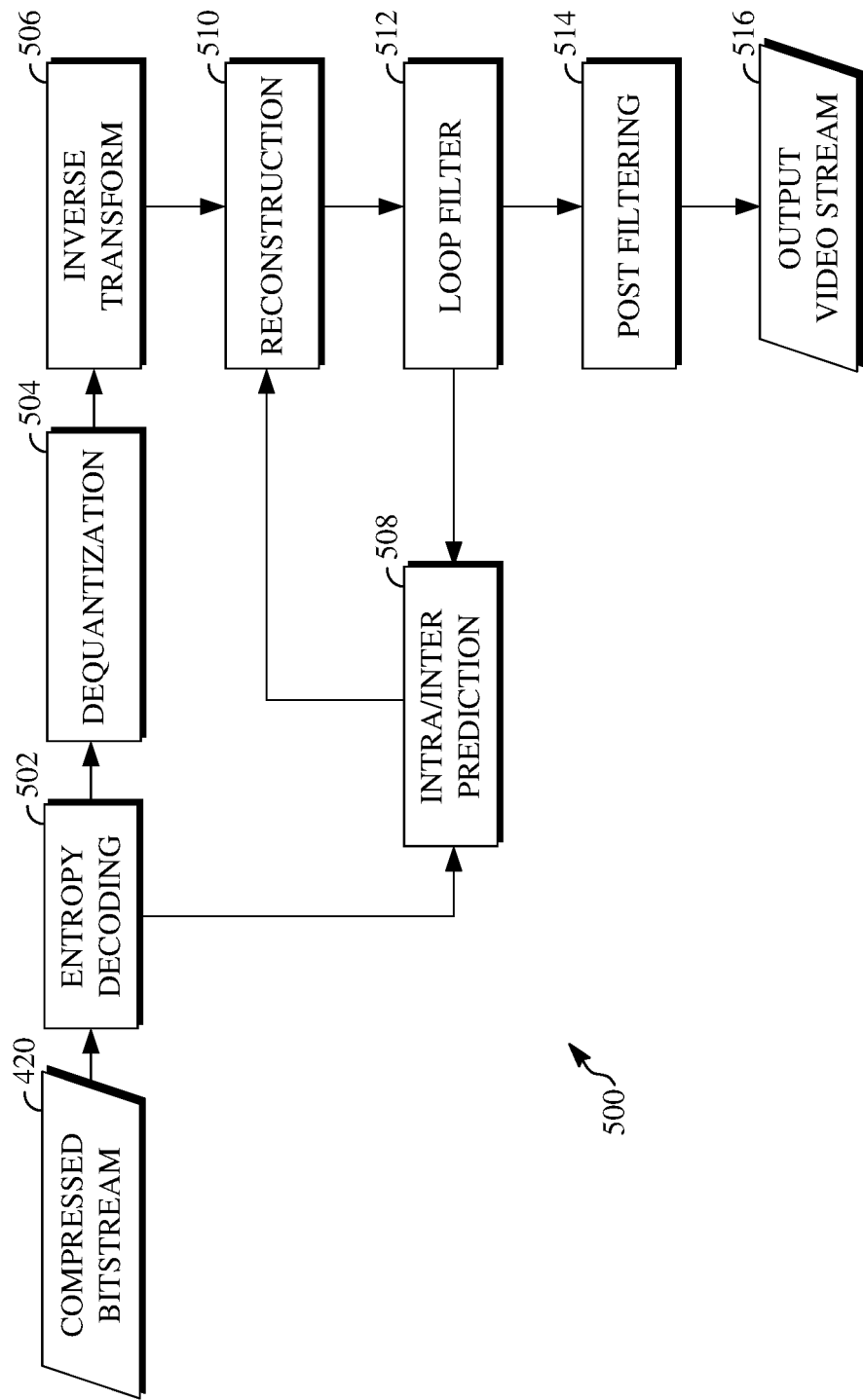
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106. In some implementations, the decoder 500 is a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figures 6, 7:
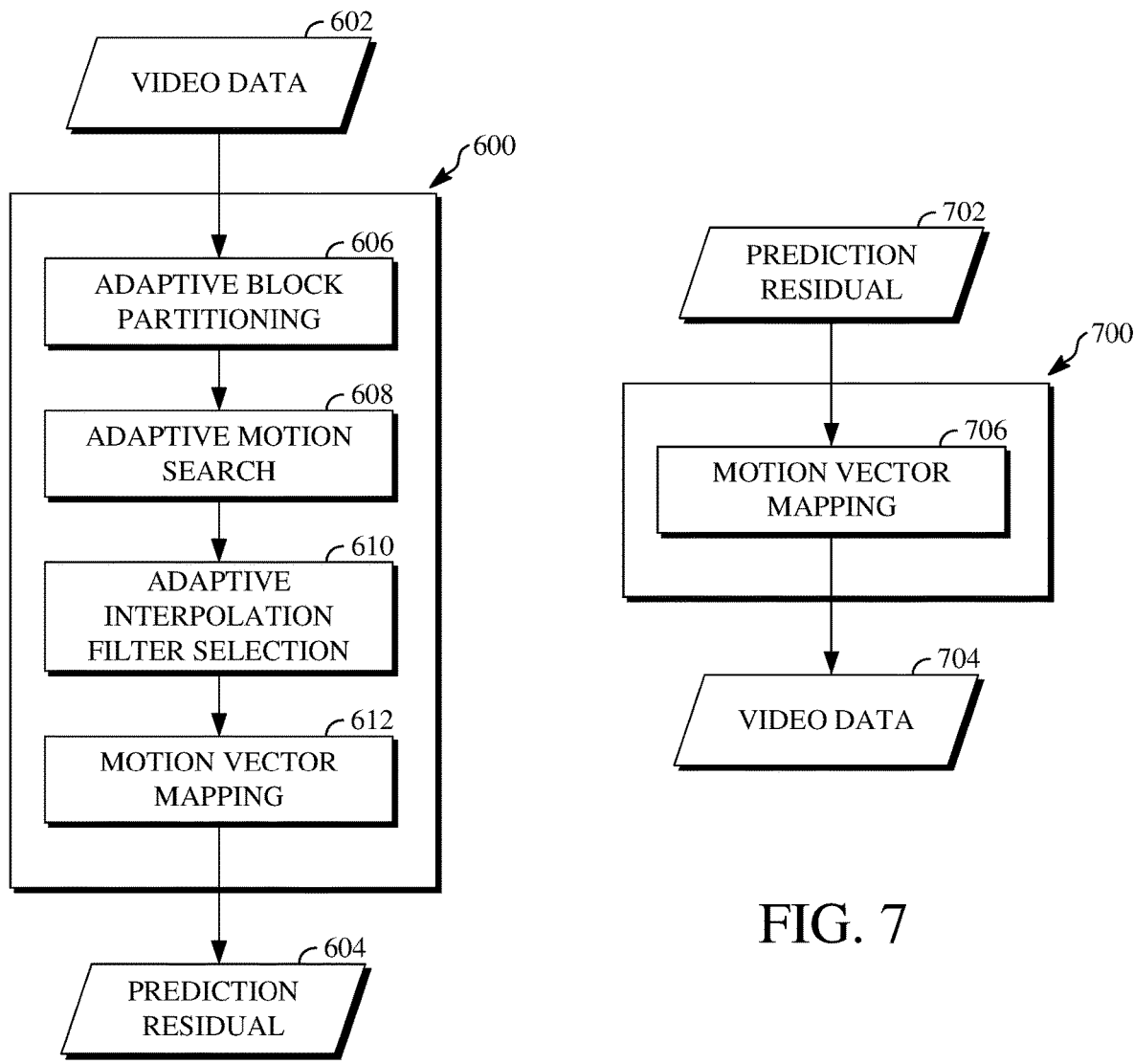
FIG. 6 is a block diagram of an example of a prediction stage used for encoding a 360 degree video.
FIG. 7 is a block diagram of an example of a prediction stage used for decoding a 360 degree video.

FIG. 6 is a block diagram of an example of a prediction stage 600 used for encoding a 360 degree video. The prediction stage 600 may be the intra/inter prediction stage 402 shown in FIG. 4 or another prediction stage used for encoding video data. The prediction stage 600 performs prediction operations for video data 602 of a 360 degree video such as to generate a prediction residual 604 for the video data 602. The video data 602 is obtained in a two-dimensional form, for example, as the frames 304 shown in FIG. 3. In particular, the video data 602 is a two-dimensional representation of a portion of a 360 degree video captured using a 360 degree camera. For example, the video data 602 may a video frame including an equirectangular projection, a cube map projection, or another projection of a sphere associated with a 360 degree video (e.g., a sphere representing the data viewable within a 360 degree video at a given time during the video).

The prediction stage 600 includes various stages for processing the video data 602 as 360 degree video data to produce the prediction residual 604 for the 360 degree video data. In particular, and as shown, the prediction stage 600 includes an adaptive block partitioning stage 606, an adaptive motion search stage 608, an adaptive interpolation filter selection stage 610, and a motion vector mapping stage 612. Although shown as part of the prediction stage 600, in some implementations, some or all of the stages 606 through 612 may occur outside of the prediction stage 600. In some implementations, one or more of the stages 606 through 612 may be omitted.

The stages 608 through 612 address inter prediction performed for 360 degree video data which has been projected to a two-dimensional format (e.g., as a video frame), for example, using equirectangular projection. In particular, the projection of the 360 degree video data transforms the latitude and longitude of the sphere into grid lines on a plane (i.e., the video frame). The latitude lines become horizontal grid lines and the longitude lines become vertical grid lines. However, because pixels on a circumpolar latitude are stretched or interpolated as part of this process, the video frame resulting from the projection cannot preserve the length, shape, or direction of objects as they appear in the spherical format of the 360 degree video. The stages 608 through 612 thus represent solutions for maintaining the size and shape of a block on the sphere during motion in view of distortion introduced by projection of the data.

The adaptive block partitioning stage 606 determines block sizes into which to partition the video data 602 based on density information for the sphere associated with the 360 degree video. The density information includes, without limitation, density distortion affecting appearances of objects within the 360 degree video based on how close or far those objects are from a center line of the sphere (e.g., an equator of the sphere, when thinking of the sphere in terms of a globe). Typically, a block partitioning process may search for partition sizes based on rate-distortion or similar optimization schemes, which may not always result in the best partitioning decisions. The search process is further complicated in the 360 degree video context given the density distortion affecting objects at certain locations within the sphere.

The adaptive block partitioning stage 606 may apply a weight (e.g., a scaling factor) to a default or other block size based on the distance of an object from the center line of the sphere. That is, objects near either pole of the sphere appear larger in the video data 602 than they actually are in the sphere itself, and so a weight value based on such distance from the center line should be used to control or otherwise guide the sizes of blocks which partition that area of the video data 602. For example, for each top and bottom hemisphere of the sphere, a first weight may be applied to portions of the video data 602 between the center line and a point between the center line and the respective pole (e.g., a tropic line on a globe, a halfway point, or the like), and a second weight may be applied to potions of the video data 602 between that point and the respective pole.

For example, blocks partitioned along the center line and thus without a weight or with a weight of 1.0 may be of size M×N (e.g., 8×8) in which M and N are the same or different integers. In another example, blocks partitioned above or below the center line and before some quarter, mid, or other point as described above in which a first weight applies may be of size O×P (e.g., 32×32) in which O and P are the same or different integers. In yet another example, blocks partitioned above that point to the respective pole in which a second weight applies may be of size Q×R (e.g., 128×128) in which Q and R are the same or different integers. Although three different sizes of blocks are described in these examples, in some cases, other numbers of sizes may be used for block partitioning.

The adaptive block partitioning stage 606 may start at the poles and work toward the center line of the sphere or it may start at the center line and work toward the poles. In some cases, there may be a natural point along the sphere at which the adaptive block partitioning stage 606 transitions to a different block size. In some cases, maximum and/or minimum block size constraints may be applied based on locations within the video data 602. For example, a constraint may force block size searching between the center line and a line one third between the center line and a topmost pole to be for sizes 4×4 and 16×16, block size searching between that one thirds line and a line two thirds between the center line and the topmost pole to be for sizes 8×8 and 64×64, and block size searching between that two thirds line and the topmost pole to be for sizes 32×32 and 256×256.

The adaptive motion search stage 608 performs a motion search within a video frame of the video data 602 to determine motion, such as based on one or more reference frames available for that video frame. The output of the motion search may, for example, be or otherwise include rotation parameters usable by the motion vector mapping stage 612. For example, the rotation parameters, as will be described below, may describe a rotational motion of one or more pixels or otherwise of a block on the sphere. The motion search performed according to the output of the adaptive motion search stage 608 may, for example, be a plane brute force search, a diamond search, another search, or a combination thereof.

In at least some cases, the adaptive motion search stage 608 performs the motion search against the output of the adaptive block partitioning stage 606. The adaptive motion search stage 608 performs the motion search using a motion search window having a size that scales or otherwise changes based on density information for the sphere. In particular, the adaptive motion search stage 608 performs the motion search against the video frame in a two-dimensional format, in which the sphere of the image has been projected (e.g., using equirectangular mapping). This results in density distortion in certain locations within the video frame, such as toward the top and bottom of the video frame, as described above. This distortion means that certain objects appear larger in the video frame than they will in the spherical representation of the video data 602. As such, a motion search window having a given size sufficient for use along a center line of the video frame may be too small to properly search for motion in those other areas of the video frame. To address this, the adaptive motion search stage 608 scales both the search area and the step size of the motion search window.

Based on an assumption that the video data 602 when in the sphere is of a uniform density but when in a two-dimensional format if of a non-uniform density, as described above, the adaptive motion search stage 608 determines a search window size and a step size for the motion search window based on a location of subject video frame data within the sphere. This is because the location of data within the sphere informs the density of the data within the two-dimensional format of the video frame. Thus, ultimately, a motion search window size and a motion search step size used closer to the top or bottom of the video frame should be larger than a motion search window size and a motion search step size used closed to the center of the video frame. The relationship between density and step size may, for example, be expressed as Density=Step Size*N. For example, where the density of the data at a certain location within the video frame is $\frac{1}{5}^{th}$, the step size for the motion search window is 5 times larger than its default value. In particular, where the video frame is an equirectangular projection of the video data from the sphere, the latitude of the sphere changes the density of the data, and the density is calculated as the cosine of the angle from the equator of the sphere. As such, in at least those cases, the scaling of the search window may be determined based on 1/cos(angle).

The adaptive interpolation filter selection stage 610 selects a sub-pixel interpolation filter size to use for motion compensation. In particular, the adaptive interpolation filter selection stage 610 alters the sub-pixel filter precision according to the density information for the sphere in which better precision (e.g., ⅛ pixel precision) is used for relatively coarse areas (e.g., where there is greater spacing between latitude lines mapped from the sphere, such as areas which are closer to the center of the video frame) and looser precision (e.g., ½ pixel or full pixel) is used for relatively denser areas (e.g., where there is lesser spacing between latitude lines mapped from the sphere, such as areas which are closer to the top or bottom of the video frame).

Consistent with what has been described above, the pixels which are closer to the top or bottom of the video frame belong to a relatively small region on the sphere such that changes in interpolation may not result in a noticeable change to a human viewer whereas the pixels which are closer to the center of the video frame belong to a region having a relatively similar size on the sphere such that changes in interpolation may be more perceptible. Thus the adaptive interpolation filter selection stage 610 determines a sub-pixel filter precision to use based on a location within the sphere of given video frame data. In at least some cases, the adaptive interpolation filter selection stage 610 uses the output of the adaptive motion search stage 608.

The motion vector mapping stage 612 uses rotation parameters for the sphere to determine motion vectors usable for further processing in conventional video encoding, such as described with respect to the encoder 400 shown in FIG. 4. The motion vectors determined using the motion vector mapping stage 612 explain motion changes in the spherical format of 360 degree video data. In particular, a motion vector determined using the motion vector mapping stage 612 is adapted to describe the movement of a block of the video data 602 from one place within the sphere to another based on rotation parameters which describe this movement. The rotation parameters represent rotational movement along the surface of the sphere in some direction, for example, using one or more of an angle, a direction of an angle, or a vector. For example, the rotation parameters for a given video block may represent a vector that is perpendicular to the video frame and an angle from which the direction of rotation can be derived. As used herein, the terms "rotate," "rotation," and permutations thereof when used in the context of using the rotation parameters to determine a motion prediction for a pixel of a current block refer to the movement, between video frames, of that pixel along a surface of the sphere such that the pixel appears to rotate on the sphere.

The motion vector mapping stage 612 selects a pixel within a current block for use in determining a motion vector the current block. Because of distortion and disproportionate changes within the block when it moves to certain locations around the sphere, pixels and thus blocks may have different motion vectors based on both the actual movement of objects within a video frame as well as the location (i.e., before and/or after movement) of those objects on the sphere. For example, as an object located toward the top or bottom pole of the sphere moves toward the center line (e.g., the equator) of the sphere, it will appear smaller as portions thereof move to a smaller total area. However, it is generally considered that pixels within a given block will have identical or similar motion vectors. As such, the motion vector mapping stage 612 selects one of the pixels in the current block and uses its motion vector as a representative of the motion vectors of the whole block, based on an assumption that the motion vectors which could be determined for other pixels of the current block would be close to that one. In one example, the motion vector mapping stage 612 selects the pixel based on its spatial location, such as by selecting an upper-left most pixel, a middle pixel, or another pixel within the block. In another example, the motion vector mapping stage 612 selects the pixel based on its content (e.g., a pixel representing some kind of color may be chosen instead of a black or white pixel) or based on neighboring video data (e.g., a pixel within an object is chosen instead of a pixel of background).

To determine a motion vector based on a selected pixel and its corresponding rotation parameters, the motion vector mapping stage 612 maps the location of the selected pixel within the video frame onto the sphere. The location of a pixel on the sphere can be specified using (x, y, z) coordinates, noting that the sum of the square of those coordinates should sum up to the square of the radius of the sphere. Alternatively, we can specify a location on a sphere based on polar coordinates, by using the radius, angle on the X/Y plane, and angle from there on the Z plane. The mapping is performed based on a projection of the video frame onto the sphere (e.g., using equirectangular or other projection). Next, a predicted location of the pixel is determined on the sphere according to the rotation parameters associated with the current block. The predicted location of the pixel is then mapped back to the video frame to determine a predicted location of the pixel within the video frame. For example, the mapping from the sphere to the video frame may be performed in a similar but inverted manner as the earlier mapping from the video frame onto the sphere. Finally, a motion vector for the pixel is determined based on the location of the pixel within the video frame and the predicted location of the pixel within the video frame. In particular, the motion vector is determined by calculating a difference between the location and the predicted location of the pixel. In at least some cases, the rotation parameters are based on a reference pixel determined by a motion search performed using the adaptive motion search stage 608. For example, the predicted location of the pixel within the video frame may be or otherwise correspond to the location of the reference pixel within a reference video frame.

The motion vector output from the motion vector mapping stage 612 for the current block is then processed according to conventional approaches, such as to determine the prediction residual 604 for the current block, transform the prediction residual 604, quantize the transform coefficients, entropy encode the quantized coefficients, and output the entropy coded syntax elements to a bitstream. In some implementations, the motion vector mapping stage 612 may perform a transform process between rotation parameters and motion vectors other than as described above, provided that there is a one-to-one mapping of the motion vectors to the rotation parameters.

FIG. 7 is a block diagram of an example of a prediction stage 700 used for decoding a 360 degree video. The prediction stage 700 may be the intra/inter prediction stage 508 shown in FIG. 5 or another prediction stage used for decoding encoded video data. The prediction stage 700 performs prediction operations against a motion vector 702 obtained from a bitstream, for example, the compressed bitstream 420 shown in FIGS. 4 and 5, to produce or otherwise determine video data 704 of a 360 degree video. The video data 704 is obtained in a two-dimensional form, for example, as the frames 304 shown in FIG. 3. In particular, the video data 704 represents a reconstructed two-dimensional representation of a portion of a 360 degree video captured using a 360 degree camera. For example, the video data 704 may be or otherwise represent a reconstruction of the video data 602 shown in FIG. 6.

The prediction stage 700 includes various stages for processing the prediction residual 702 to produce the video data 704 for the 360 degree video data. In particular, and as shown, the prediction stage 700 includes a motion vector mapping stage 706. Although shown as part of the prediction stage 700, in some implementations, the motion vector mapping stage 706 may occur outside of the prediction stage 600.

The motion vector mapping stage 706 inverses the process performed by the motion vector mapping stage 612 shown in FIG. 6. The obtains motion vector mapping stage 706 a motion vector representative of motion within a current block, such as from the bitstream received at the decoder, and uses the motion vector and the prediction residual 702 to produce the video data 704. In particular, the motion vector mapping stage 706 uses the motion vector to determine rotation parameters for the current block. The rotation parameters are rotation parameters as described above with respect to FIG. 6.

The motion vector mapping stage 706 inverses the process performed by the motion vector mapping stage 612 by first using the motion vector to obtain a predicted location of a pixel. The pixel may, for example, be a pixel selected as described above with respect to the motion vector mapping stage 612 shown in FIG. 6. For example, the selected pixel used by the motion vector mapping stage 706 may be the same as the selected pixel used by the motion vector mapping stage 612. In another example, the selected pixel used by the motion vector mapping stage 706 may be different from the selected pixel used by the motion vector mapping stage 612. The predicted location of the pixel represents the location of the pixel within the prediction residual and thus according to the motion indicated by the motion vector. The motion vector mapping stage 706 maps the predicted location of the pixel onto the sphere. The motion vector mapping stage 706 then determines the rotation parameters for the current block based on the location on the sphere at which the predicted location of the pixel is mapped. In particular, the location of the pixel within the video frame being decoded is used to determine a mapped predicted location of the pixel on the sphere. The motion vector is used to determine the location of the pixel within the video frame and that location is used to determine a mapped location of the pixel on the sphere. The motion vector mapping stage 706 then determines the rotation parameters for the current block based on the mapped predicted location and the mapped location of the pixel on the sphere. For example, the rotation parameters may be determined by calculating a difference between the mapped predicted location and the mapped location of the pixel on the sphere.

The rotation parameters output from the motion vector mapping stage 706 for the current block are then processed as part of the video data 704 to reconstruct the video frame being decoded, filter the reconstructed video frame, project or otherwise map or reformat the video frame into a sphere, and output the sphere for display. In some implementations, the motion vector mapping stage 706 may perform a transform process between motion vectors and rotation parameters other than as described above, provided that there is a one-to-one mapping of the rotation parameters to the motion vectors.

Figure 8:
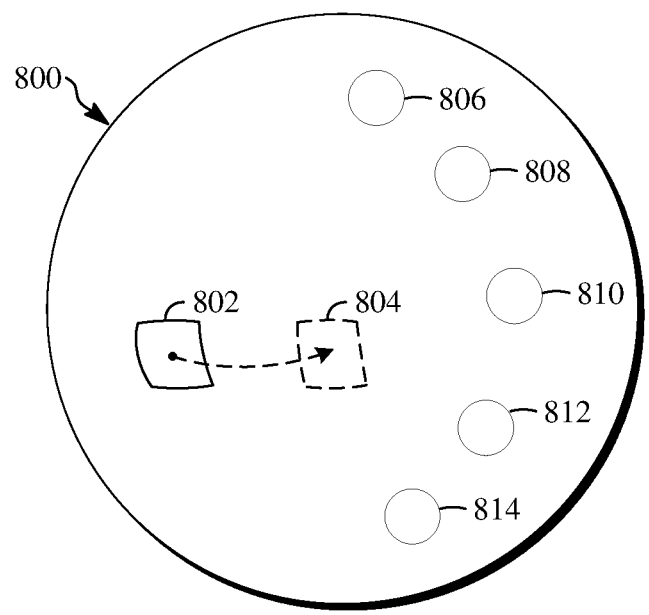
FIG. 8 is an illustration of an example of pixel mapping and motion along a sphere representing a 360 degree video.

FIG. 8 is an illustration of an example of pixel mapping and motion on a sphere 800 representing a 360 degree video. The 360 degree video data shown by the sphere represents a video frame captured using a 360 degree video camera (i.e., a 360 degree view of video information at a single moment in time during the 360 degree video). Pixel mapping and motion are evaluated for motion processing, such as described with respect to the prediction stages 600 and 700 shown in FIGS. 6 and 7. In particular, the pixel mapping and motion can be performed to determine a motion of pixels within a video block from a first, original location 802 on the sphere 800 to a second, predicted location 804 on the sphere 800. A center pixel of the video block is selected, as shown by the dot within the original location 802, and rotation parameters associated with the video block are used to determine a predicted motion of the video block, as shown by the dashed line between the original location 802 and the predicted location 804. A motion vector determined based on those rotation parameters thus represents the motion of the video block from the original location 802 to the predicted location 804 in a two-dimensional projection of the sphere 800, such as in a conventional video frame format.

Figure 9:
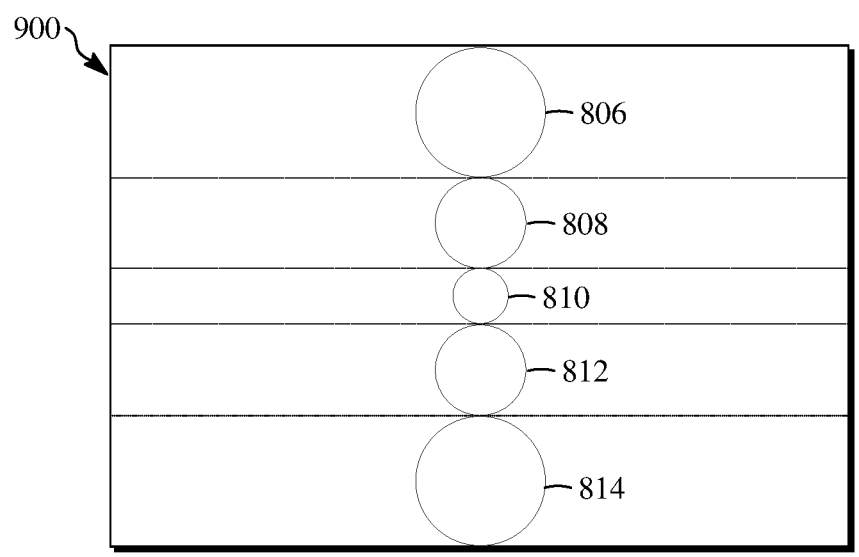
FIG. 9 is an illustration of an example of density distortion based on locations along a sphere representing a 360 degree video.

FIG. 9 is an illustration of an example of density distortion based on locations along a sphere representing a 360 degree video. In particular, a video frame 900 is shown. The video frame 900 is a projection (e.g., an equirectangular projection) of the sphere 800 shown in FIG. 8. The video frame 900 includes objects shown in the sphere 800, including objects 806 through 814 shown in FIG. 8 as being on the sphere 800 and which are shown in the video frame 900 in FIG. 9. While the objects 806 through 814 are shown as being of uniform size in the sphere 800, the projection of the 360 degree video data of the sphere 800 onto the two-dimensional structure of the video frame 900 results in density distortion to the objects 806 through 814 such that the objects 806 through 814 are of different sizes based on their locations on the sphere 800. In particular, the objects 806 and 814 are close to the top and bottom poles of the sphere, respectively, and as such appear much larger in the video frame 900 than in the sphere 800. The objects 808 and 812 are somewhere between the objects 806 and 814, respectively, and the center line (e.g., equator) of the sphere 800 and thus appear somewhat larger in the video frame 900 than in the sphere 900. The object 810 is along or nearly along the center line of the sphere 800 and thus appears in the same size in the sphere 800 and in the video frame 900. The density distortion affecting the sizing of the objects 806 through 814 is used for various processing, including by the stages 606 through 612 shown in FIG. 6.

Figure 10:
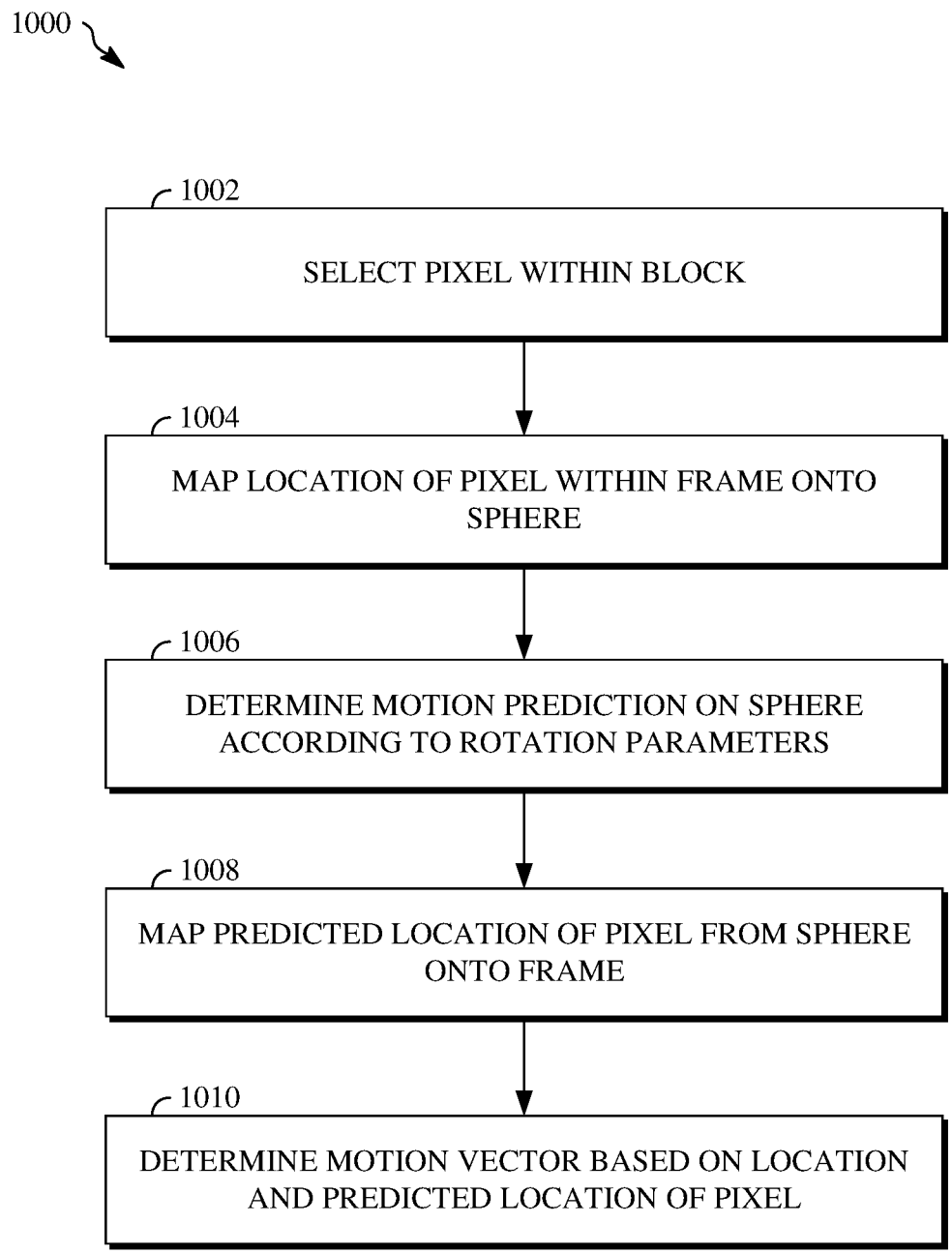
FIG. 10 is a flowchart diagram of an example of a technique for encoding 360 degree video data using motion vector mapping.
Figure 11:
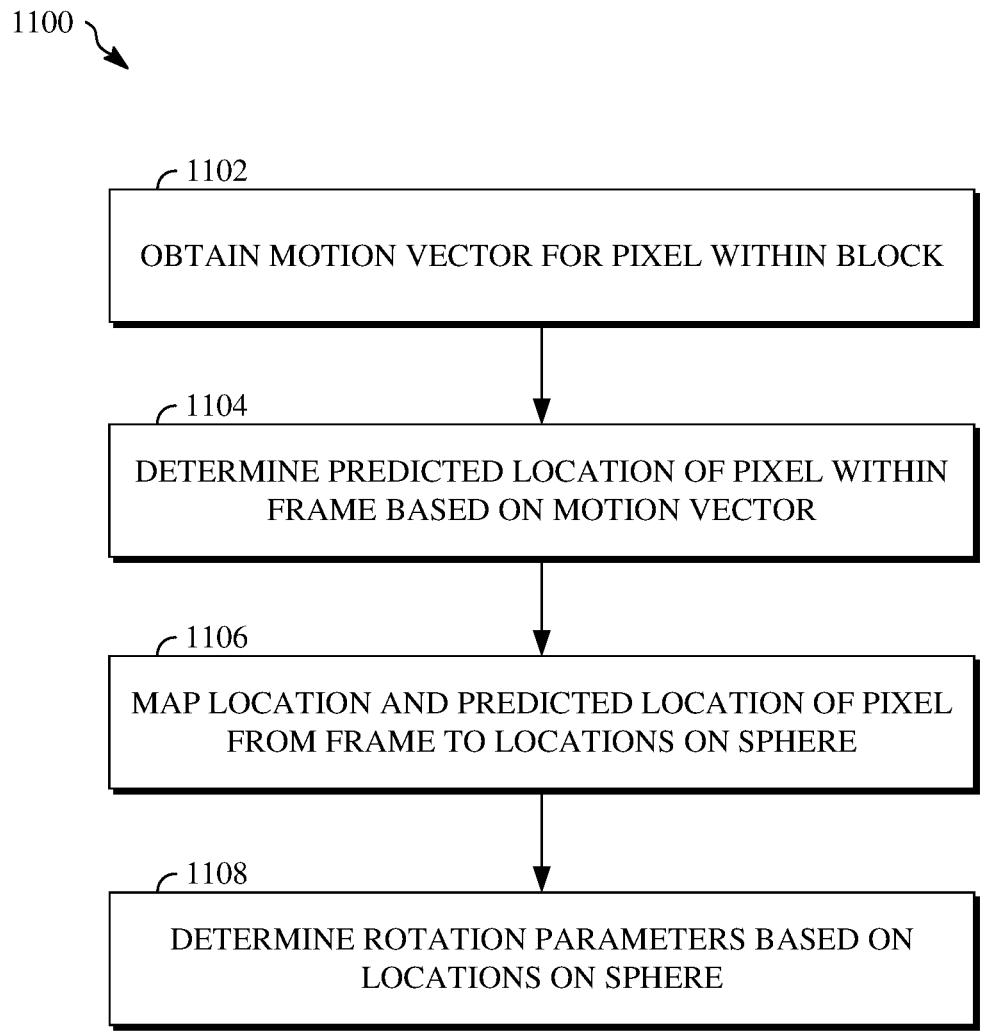
FIG. 11 is a flowchart diagram of an example of a technique for decoding 360 degree video data using motion vector mapping.
Figure 12:
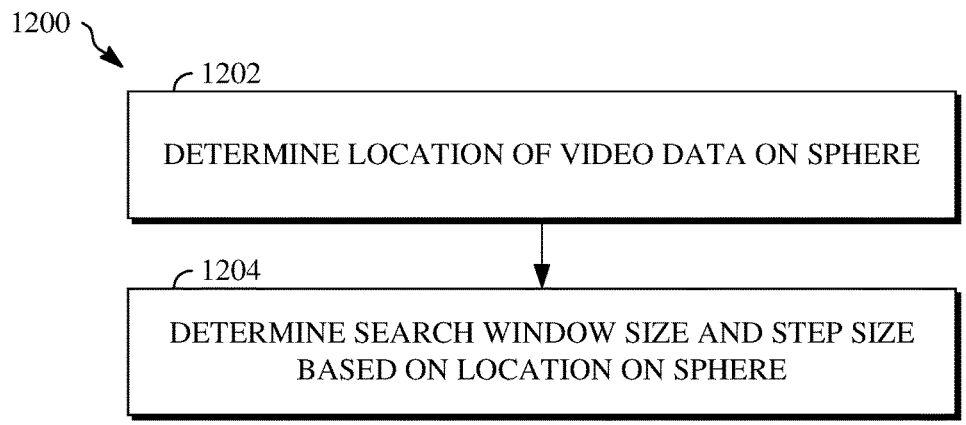
FIG. 12 is a flowchart diagram of an example of a technique for adaptive motion searching for 360 degree video data.
Figure 13:
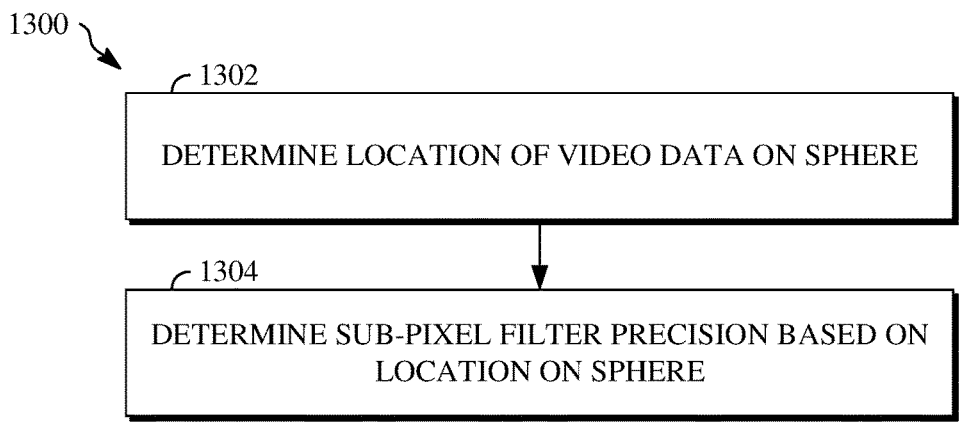
FIG. 13 is a flowchart diagram of an example of a technique for adaptive interpolation filter selection for 360 degree video data.
Figure 14:
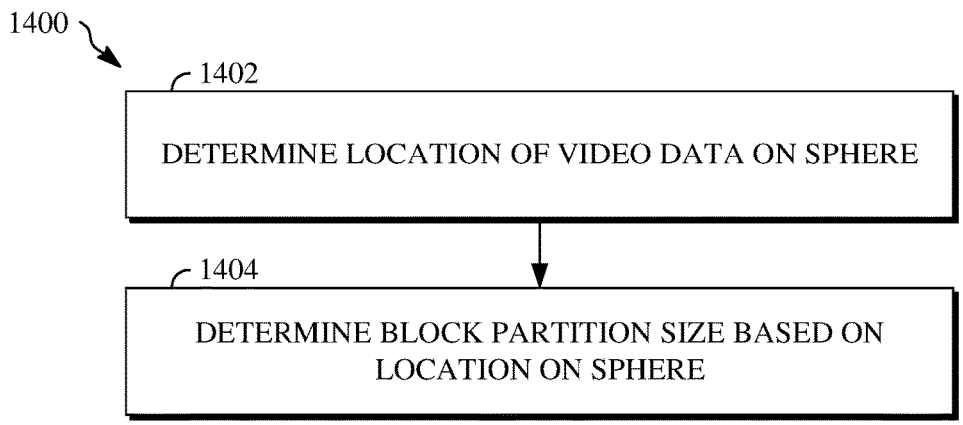
FIG. 14 is a flowchart diagram of an example of a technique for adaptive block partitioning for 360 degree video data.

Further details of techniques for mapping-aware coding for 360 degree videos are now described. FIG. 10 is a flowchart diagram of an example of a technique 1000 for encoding 360 degree video data using motion vector mapping. FIG. 11 is a flowchart diagram of an example of a technique 1100 for decoding 360 degree video data using motion vector mapping. FIG. 12 is a flowchart diagram of an example of a technique 1200 for adaptive motion searching for 360 degree video data. FIG. 13 is a flowchart diagram of an example of a technique 1300 for adaptive interpolation filter selection for 360 degree video data. FIG. 14 is a flowchart diagram of an example of a technique 1400 for adaptive block partitioning for 360 degree video data.

The technique 1000, the technique 1100, the technique 1200, the technique 1300, and/or the technique 1400 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 1000, the technique 1100, the technique 1200, the technique 1300, and/or the technique 1400. The technique 1000, the technique 1100, the technique 1200, the technique 1300, and/or the technique 1400 can be implemented using specialized hardware or firmware. For example, a hardware component configured to perform the technique 1000, the technique 1100, the technique 1200, the technique 1300, and/or the technique 1400. As explained above, some computing devices may have multiple memories or processors, and the operations described in the technique 1000, the technique 1100, the technique 1200, the technique 1300, and/or the technique 1400 can be distributed using multiple processors, memories, or both.

For simplicity of explanation, the techniques 1000, the technique 1100, the technique 1200, the technique 1300, and the technique 1400 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 10, the technique 1000 for encoding 360 degree video data using motion vector mapping is shown. At 1002, a pixel within a current block to encode is selected. The pixel is selected to represent motion of the current block for purposes of the motion vector mapping. The pixel may be selected based on one or both of a spatial location of the pixel within the current block or a content of the pixel. For example, the pixel may be selected because the pixel is an upper-left most pixel or a middle pixel within the current block. In another example, the pixel may be selected because it has a highest luminance, chrominance, or other value within the current block. In yet another example, the pixel may be selected because it has a color which may be associated with an object represented by the pixels of the current block.

At 1004, a location of the selected pixel within a video frame that includes the current block is mapped from the video frame onto a sphere representing the video data in a 360 degree format. For example, the video frame may be an equirectangular projection of 360 degree video data represented by the sphere, in which the current block is a block of the 360 degree video data. The projection of the 360 degree video data expresses the position of data within the projection at grid coordinates based on horizontal and vertical lines respectively corresponding to latitude and longitude lines of the sphere. In one example, the location of the pixel on the sphere can be specified using (x, y, z) coordinates. In another example, the location of the pixel on the sphere can be specified using polar coordinates, for example, based on the radius, angle on the X/Y plane, and angle from there on the Z plane.

At 1006, a motion prediction of the pixel is determined on the sphere according to rotation parameters associated with the current block. In particular, the motion prediction of the pixel is determined on the sphere from the location of the pixel to a predicted location of the pixel according to the rotation parameters. The rotation parameters represent rotational movement of at least a portion of the current block using one or more of an angle, a direction of an angle, or a vector. In some cases, the rotation parameters can be obtained from or otherwise determined based on a motion search performed against the sphere. In other cases, the rotation parameters can be obtained from or otherwise determined based on a separate process performed during the encoding of the 360 degree video data, for example, as part of another process for rotational motion modeling and/or temporal prediction of 360 degree video data. Determining the motion prediction of the pixel can include moving the pixel from the location of the pixel as mapped to the sphere to the predicted location according to the rotation parameters. For example, moving the pixel according to the rotation parameters can include rotating the pixel to the predicted location, such as by starting from the location mapped to the sphere and rotating the pixel according to the rotation parameters until the pixel arrives at the predicted location (e.g., based on an angle and vector specifying at least a direction and a magnitude of movement).

At 1008, the predicted location of the pixel is mapped from the sphere onto the video frame. Mapping the predicted location of the pixel from the sphere onto the video frame can be performed by the inverse of the process for mapping the location of the pixel within the video frame from the video frame onto the sphere, as described above.

At 1010, a motion vector is determined for the pixel and thus for the current block. The motion vector is determined based on the location of the pixel within the video frame and the predicted location of the pixel within the video frame mapped from the sphere. In particular, the motion vector is determined by calculating a difference between the location of the pixel within the video frame and the predicted location of the pixel within the video frame.

The technique 1000 is performed as part of an encoding of the current block. In some implementations, the encoding of the current block can include performing adaptive processing of the current block for predicting motion of the current block based on density information determined according to a location of the current block on the sphere. For example, performing the adaptive processing may include performing a motion search for the current block using a motion search window based on a density distortion according to the location of the current block on the sphere, such as described with respect to FIG. 12. In another example, performing the adaptive processing may include selecting a sub-pixel interpolation filter size for the current block based on a density distortion according to the location of the current block on the sphere, such as described with respect to FIG. 13. In yet another example, performing the adaptive processing may include determining a block partition size for the current block based on a density distortion according to the location of the current block on the sphere, as described with respect to FIG. 14. For example, the block partition size is between a minimum block partition size and a maximum block partition size defined for a latitude range of the sphere which includes the location of the current block on the sphere.

Referring next to FIG. 11, the technique 1100 for decoding 360 degree video data using motion vector mapping is shown. At 1102, a motion vector is obtained for a pixel within a current block of a video frame to be decoded. The motion vector may be obtained from a bitstream which includes the encoded video frame. For example, the motion vector may be decoded directly from that bitstream. In another example, the motion vector may be calculated based on other data decoded from that bitstream. The pixel is selected within the current block to represent all of the pixels in the current block for purposes of the motion vector mapping. For example, the pixel may be an upper-left most pixel within the current block, a middle pixel within the video block, or another pixel within the current block. In another example, the pixel may be a pixel representing a portion of an object shown in the current block. The pixel may thus be selected based on its spatial location within the current block and/or based on its contents.

At 1104, a predicted location of the pixel within the video frame is determined based on the motion vector. In particular, a location of the pixel of the current block is determined within the video frame. The predicted location of the pixel can then be calculated based on the location of the pixel within the video frame and the motion vector.

At 1106, the original and predicted locations of the pixel are mapped from the video frame to sphere locations on a sphere representing the video data in a 360 degree format. The mapping of the original and predicted locations of the pixel may be mapped from the video frame to the sphere as described above, for example, with respect to FIG. 10.

At 1108, rotation parameters are determined based on the locations on the sphere of the location and predicted location of pixel mapped from the video frame. Determining the rotation parameters can include calculating one or more of an angle, direction of an angle, or a vector of the rotational motion of the current block based on a difference between the location on the sphere of the location of the pixel and the location on the sphere of the predicted location of the pixel. The rotation parameters may then be used to reconstruct the current block as part of a decoding of the current block for display in a 360 degree video.

Referring next to FIG. 12, the technique 1200 for adaptive motion searching for 360 degree video data is shown. In particular, the technique 1200 describes operations associated with performing an adaptive processing by motion searching of a current block for predicting motion of the current block based on density information determined according to a location of the current block on a sphere. At 1202, a location of video data is determined on a sphere representing the video data in a 360 degree format. At 1204, a search window size and a step size for the motion search are determined based on the location on the sphere.

Referring next to FIG. 13, the technique 1300 for adaptive interpolation filter selection for 360 degree video data is shown. In particular, the technique 1300 describes operations associated with performing an adaptive processing by interpolation filter selection for a current block for predicting motion of the current block based on density information determined according to a location of the current block on a sphere. At 1302, a location of video data is determined on a sphere representing the video data in a 360 degree format. At 1304, a sub-pixel filter precision to use for the interpolation is determined based on the location on the sphere.

Referring last to FIG. 14, the technique 1400 for adaptive block partitioning for 360 degree video data is shown. In particular, the technique 1400 describes operations associated with performing an adaptive processing by block partitioning for a current block for predicting motion of the current block based on density information determined according to a location of the current block on a sphere. At 1402, a location of video data is determined on a sphere representing the video data in a 360 degree format. At 1404, a block partition size for the video data is determined based on the location on the sphere.

The aspects of encoding and decoding described above illustrate some examples of encoding and decoding techniques. However, it is to be understood that encoding and decoding, as those terms are used in the claims, could mean compression, decompression, transformation, or another processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500, or another encoder, decoder, or transcoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:
    mapping a location of a pixel of a current block from a video frame to a sphere;
    determining, on the sphere, a motion prediction of the pixel from the location of the pixel to a predicted location of the pixel according to rotation parameters associated with the current block;
    mapping the predicted location of the pixel from the sphere to the video frame;
    determining a motion vector based on the location and the predicted location within the video frame; and
    encoding the current block based on the motion vector,
    wherein a block partition size for the current block is determined based on a density distortion according to a location of the current block on the sphere and is between a minimum block partition size and a maximum block partition size defined for a latitude range of the sphere which includes the location of the current block on the sphere.

2. The method of claim 1, wherein the pixel is selected based on one or both of a spatial location of the pixel within the current block or a content of the pixel.

3. The method of claim 2, wherein the pixel is an upper-left most pixel or a middle pixel within the current block.

4. The method of claim 1, wherein the rotation parameters represent rotational movement of at least a portion of the current block using one or more of an angle, a direction of an angle, or a vector.

5. The method of claim 1, the method comprising:
    performing adaptive processing of the current block for predicting motion of the current block based on density information determined according to the location of the current block on the sphere.

6. The method of claim 5, wherein performing the adaptive processing comprises:
    performing a motion search for the current block using a motion search window based on a density distortion according to the location of the current block on the sphere.

7. The method of claim 5, wherein performing the adaptive processing comprises:
    selecting a sub-pixel interpolation filter size for the current block based on a density distortion according to the location of the current block on the sphere.

8. The method of claim 1, wherein the video frame is an equirectangular projection of 360 degree video data represented by the sphere.

9. A method, comprising:
    determining a motion vector for predicting motion of a current block of a 360 degree video based on a location of a pixel of the current block within a video frame including the current block and based on a motion prediction of the pixel determined on a sphere representative of the 360 degree video from the location of the pixel to a predicted location of the pixel according to rotation parameters associated with the current block; and
    encoding the current block based on the motion vector,
    wherein a block partition size for the current block is determined based on a density distortion according to a location of the current block on the sphere and is between a minimum block partition size and a maximum block partition size defined for a latitude range of the sphere which includes the location of the current block on the sphere.

10. The method of claim 9, wherein determining the motion vector comprises:
    mapping the location of the pixel from the video frame to the sphere;
    determining the predicted location of the pixel based on the original location of the pixel and the rotation parameters;
    mapping the predicted location of the pixel from the sphere to the video frame; and
    determining the motion vector by calculating a difference between the location of the pixel and the predicted location of the pixel.

11. The method of claim 9, the method comprising:
    performing a motion search for the current block using a motion search window based on a density distortion according to the location of the current block on the sphere.

12. The method of claim 9, the method comprising:
    selecting a sub-pixel interpolation filter size for the current block based on a density distortion according to the location of the current block on the sphere.

13. The method of claim 9, wherein the pixel is selected based on one or both of a spatial location of the pixel within the current block or a content of the pixel.

14. A method, comprising:
 determining a location of a pixel of a current block within a video frame;
 determining a predicted location of the pixel within the video frame based on a motion vector for the current block;
 mapping the location of the pixel and the predicted location of the pixel from the video frame to locations on a sphere;
 determining rotation parameters associated with the current block based on the locations on the sphere; and
 decoding the current block for display in a 360 degree video using the rotation parameters,
 wherein a block partition size for the current block is determined based on a density distortion according to a location of the current block on the sphere and is between a minimum block partition size and a maximum block partition size defined for a latitude range of the sphere which includes the location of the current block on the sphere.

15. The method of claim 14, wherein the rotation parameters represent rotational movement of at least a portion of the current block, and wherein decoding the current block using the rotation parameters comprises:
 reconstructing the current block from a prediction residual based on the rotation parameters.

16. The method of claim 14, wherein the pixel is selected based on one or both of a spatial location of the pixel within the current block or a content of the pixel.

17. The method of claim 14, wherein the motion vector is obtained from a bitstream which includes the video frame.

18. The method of claim 13, wherein the pixel is an upper-left most pixel or a middle pixel within the current block.

19. The method of claim 9, wherein the rotation parameters represent rotational movement of at least a portion of the current block using one or more of an angle, a direction of an angle, or a vector.

20. The method of claim 9, wherein the video frame is an equirectangular projection of 360 degree video data represented by the sphere.

* * * * *